Jan. 23, 1968     D. P. ALLEN     3,365,263
INFLATABLE NOSE PAD FOR RAISING AND LOWERING SPECTACLE FRAMES
Filed Feb. 19, 1965
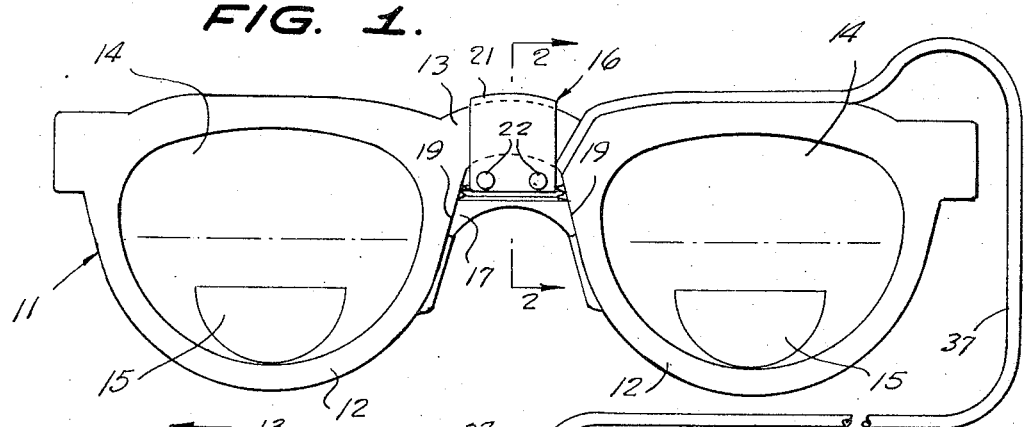
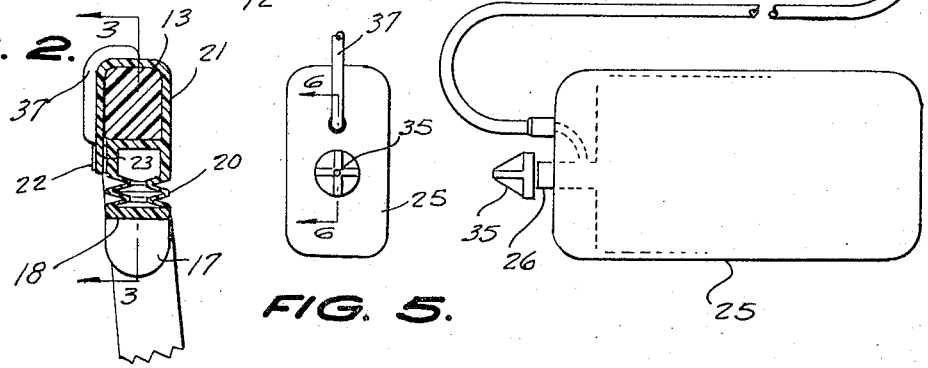
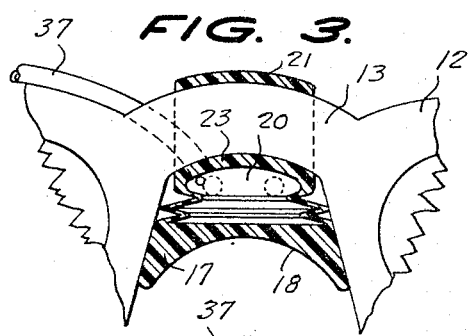
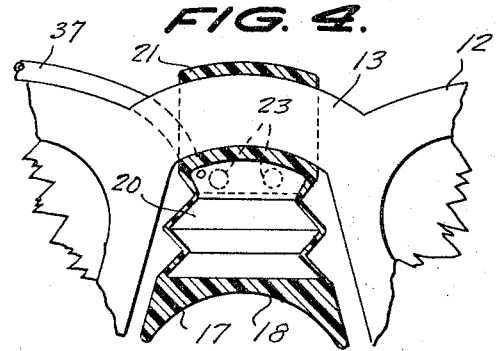
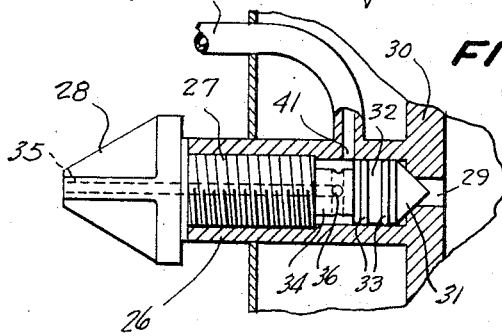
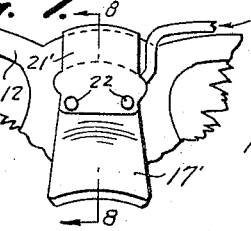
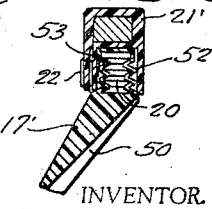
INVENTOR.
DAVID P. ALLEN,
BY
Berman, Davidson & Berman
ATTORNEYS.

United States Patent Office 3,365,263
Patented Jan. 23, 1968

3,365,263
INFLATABLE NOSE PAD FOR RAISING AND
LOWERING SPECTACLE FRAMES
David P. Allen, 1600 Welch Place,
Charlotte, N.C. 28208
Filed Feb. 19, 1965, Ser. No. 433,928
3 Claims. (Cl. 351—55)

ABSTRACT OF THE DISCLOSURE

A pair of spectacles is provided with an auxiliary nose pad and expansible chamber connected to the bridge. A reservoir and valve means is connected to the chamber and operated to raise and lower the spectacle frame.

This invention relates to mounting supports for eyeglasses, and more particularly to an eyeglass attachment to provide an adjustable support engageable with the wearer's nose so that the spectacles may be at times elevated, for example, where the spectacles are of the bifocal type and where it may be desired to bring the normally lowered auxiliary lens portions of the eyeglasses to an elevated position for the convenience of the wearer.

A main object of the invention is to provide a novel and improved inflatable nose pad particularly adapted for use with bifocal eyeglasses for the purpose of providing a means for at times elevating the eyeglasses from their normal positions, the device being simple in construction, being easy to install, and being easy to operate.

A further object of the invention is to provide an improved inflatable nose pad attachment for a pair of bifocal spectacles, the attachment being inexpensive to fabricate, being durable in construction, being very compact in size, and being comfortable to wear.

A still further object of the invention is to provide an improved pneumatically operated elevating means for use as a nose pad for bifocal spectacles, the device involving relatively few parts, being easy to attach and to detach from the bridge of a pair of spectacles, and being relatively inconspicuous in appearance.

Further objects and advantages of the invention will become apparent from the following description and claims, and from the accompanying drawings, wherein:

FIGURE 1 is a front elevational view of a pair of bifocal eyeglasses provided with an improved inflatable nose pad device constructed in accordance with the present invention.

FIGURE 2 is a transverse vertical cross sectional view taken substantially on the line 2—2 of FIGURE 1.

FIGURE 3 is a fragmentary longitudinal cross sectional view taken substantially on the line 3—3 of FIGURE 2 and showing the manner in which the normally deflated attachment is fitted to the bridge portion of the associated pair of eyeglasses.

FIGURE 4 is a longitudinal cross sectional view similar to FIGURE 3, but showing the nose pad device in its inflated position.

FIGURE 5 is an end elevational view of the pressure fluid reservoir associated with the inflatable nose pad device of FIGURES 1 to 4.

FIGURE 6 is an enlarged cross sectional detail view taken substantially on the line 6—6 of FIGURE 5.

FIGURE 7 is a fragmentary front elevational view of a modified form of inflatable nose pad device according to the present invention.

FIGURE 8 is a transverse vertical cross sectional view taken substantially on the line 8—8 of FIGURE 7.

Referring to the drawings, 11 generally designates a pair of eyeglasses comprising the respective eyeglass frames 12, 12 connected by a bridge 13, the frames 12 containing lenses 14, 14 of the type including the supplementary lens elements 15, 15 located at the lower portions of frames 12. Thus, the spectacles 11 are of the conventional bifocal type. Ordinarily the auxiliary lens elements 15, 15 are used for reading, and the wearer necessarily must look downwardly through the elements 15, 15 to use same, instead of looking forwardly as he does when employing the main lenses 14, 14. However, in many instances it is desirable to utilize the auxiliary lens elements 15, 15 with the eyes directed forwardly, for example, when the user is performing close work in an erect position and wherein the material being worked on is at a substantial height, for example, at or near the user's eye level. A prime purpose of the present invention is to provide a means for elevating the spectacles 11 sufficiently to provide vision through the auxiliary lens elements 15, 15 with the eyes directed substantially forwardly.

Designated generally at 16 is an elevating attachment constructed in accordance with the present invention and comprising a substantially rigid nose piece 17 shaped to engage on a wearer's nose, for example, being formed with the downwardly concave bottom surface 18. The nose piece 17 is also shaped to fit between the inner portions of the eyeglass frames 12, 12, for example, having upwardly and inwardly inclined side edges 19 shaped to conformably engage against the inner end portions of the eyeglass frames 12, 12. Formed integrally with the nose piece 17 is the upwardly expansible, substantially vertical bellows chamber 20, the top end of said chamber being provided with a strap member 21 which is preferably integrally formed with the top wall of the bellows chamber and which is sufficiently flexible to engage around the bridge portion 13 of the spectacles in the manner illustrated in FIGURES 1 and 2. Thus, the strap member 21 is of substantially inverted U-shape, as shown in FIGURE 2, and is provided with respective snap fastener elements 22, 22 at its corner portions which are lockingly engageable with cooperating snap fastener elements 23 mounted on the outer wall portion of the top end of the bellows chamber 20.

Designated at 25 is a small container of fluid under pressure, such as compressed air, which the user may carry in a convenient pocket or supported in any other convenient manner on his person. The reservoir 25 is provided at one end with a valve conduit 26 which threadedly receives the externally threaded shank portion 27 of a valve element, said shank portion being provided with the external operating knob 28. The interior of the conduit 26 communicates through a port 29 in the main wall 30 with the interior of the reservoir 25, being blocked off by the conical end 31 of a valve head 32 formed integrally with and axially carried by the threaded shank 27. The head 32 is provided with sealing rings 33 which slidably engage the inside surface of the bore of conduit 26. The shank of the valve element is provided with the reduced intermediate portion 34 located adjacent the head 32, said intermediate portion being exposed to the interior of the conduit 26 behind the head 32, as shown in FIGURE 6. A vent passage 35 extends axially through the valve member 27 and communicates with a plurality of radially extending passages 36 formed in the intermediate portion 34 of the valve element. The intermediate portion of the rigid conduit 26 is connected by a flexible conduit 37 to the bellows chamber 20.

When it is desired to inflate the bellows chamber 20 and thereby elevate the spectacles 11 relative to the nose piece 17, the user rotates the knob 35 sufficiently to move the valve head element 32 outwardly past the connection port 41 of conduit 37, thereby placing said port 41 in communication with the port 29, whereby fluid under pressure is admitted into the bellows chamber 20, causing the spectacles to be elevated relative to the nose piece 17, as required. When it is desired to allow the spectacles to descend to their normal positions, the knob 28 is screwed inwardly to move the head member 32 back against its seat at the port 29, thereby exposing the port 41 to the vent passage 35, whereby the compressed fluid is allowed to escape from the bellows chamber 20, whereby said bellows chamber assumes its normally contracted condition, shown in FIGURES 1, 2 and 3.

As shown in FIGURES 7 and 8, the shape of the nose piece, shown at 17', may be such as to extend downwardly and forwardly along the wearer's nose, being internally contoured, as shown at 50, to comfortably fit thereon. As shown in FIGURE 8, the nose piece 17' is of substantial length and tapers downwardly in thickness. The surface 50 may be provided with any suitable lining or cushioning material impervious to perspiration and non-irritating to the skin surface. The same is true with respect to the downwardly concave nose-engaging surfaces of the nose piece member 17 in the previously described form of the invention.

The reservoir 25 may contain any suitable non-inflammable gas under pressure, and may be either carried in the pocket, as above mentioned, may be worn upon the user's lapel, or may even be clipped to one of the temples of the pair of spectacles 11 with which the device is employed.

As shown in FIGURE 8, the strap member in the modified form of the device, shown at 21', may be provided with respective rear and front depending flanges 52 and 53 between which the bellows 20 is received, the front flange 53 being provided with the snap fastener elements cooperating with those carried by the front portion of the strap member 21'.

While certain specific embodiments of an improved inflatable nose pad have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a pair of spectacles having eyeglass frames connected by a bridge, a nose piece engageable between said eyeglass frames, an inflatable vertically expansible chamber connected between said nose piece and said bridge, a reservoir containing fluid under pressure, conduit means connecting said reservoir to said chamber, and valve means between said conduit means and said reservoir for at times admitting fluid under pressure into said conduit means.

2. In combination, a pair of bifocal spectacles having eyeglass frames and a bridge connecting said eyeglass frames, a nose piece shaped to engage between said eyeglass frames and having a bottom portion contoured to fit on a wearer's nose, a vertically expansible inflatable bellows connecting said bridge to said nose piece, a reservoir containing fluid under pressure, and conduit means connecting said reservoir to said bellows and including a valve to control the admission of fluid into said bellows.

3. In combination, a pair of bifocal spectacles having eyeglass frames and a bridge connecting said eyeglass frames, a nose piece shaped to engage between said eyeglass frames and having a bottom portion contoured to fit on a wearer's nose, a vertically expansible inflatable bellows connecting said bridge to said nose piece, a reservoir containing fluid under pressure, conduit means connecting said reservoir to said bellows and including a valve to control the admission of fluid into said bellows, said valve having at least two positions, means to connect the reservoir to said bellows in one position of the valve, and means to connect the bellows to atmosphere in a second position of the valve.

No references cited.

DAVID H. RUBIN, *Primary Examiner.*

W. BROWN, *Assistant Examiner.*